United States Patent [19]
Sueyoshi et al.

[11] Patent Number: 5,784,641
[45] Date of Patent: Jul. 21, 1998

[54] INPUT/OUTPUT SUBSYSTEM FOR COMPUTER

[75] Inventors: Minoru Sueyoshi; Katsuya Ishiyama, both of Kawasaki, Japan

[73] Assignee: Fujitsu Limited, Kawasaki, Japan

[21] Appl. No.: 745,800

[22] Filed: Nov. 8, 1996

Related U.S. Application Data

[63] Continuation of Ser. No. 255,941, Jun. 7, 1994, abandoned.

[30] Foreign Application Priority Data

Sep. 28, 1993 [JP] Japan ................................. 5-240928

[51] Int. Cl.⁶ .............................................. G06F 1/26
[52] U.S. Cl. ................................ 395/822; 395/750.01
[58] Field of Search .......................... 395/822, 828, 395/832, 835, 884, 892, 894, 182.12, 182.2, 183.12, 750.01, 750.02, 750.07, 750.08, 800.01; 364/707, 708.1, 709.01

[56] References Cited

U.S. PATENT DOCUMENTS

| | | | |
|---|---|---|---|
| 4,312,035 | 1/1982 | Greene | 364/200 |
| 4,747,041 | 5/1988 | Engel et al. | 364/200 |
| 5,019,717 | 5/1991 | McCurry et al. | 307/66 |
| 5,121,500 | 6/1992 | Arlington et al. | 395/750 |
| 5,239,495 | 8/1993 | Nanno et al. | 364/707 |
| 5,299,322 | 3/1994 | Arai et al. | 395/275 |
| 5,408,669 | 4/1995 | Stewart et al. | 395/750 |
| 5,410,712 | 4/1995 | Okuno | 395/750 |
| 5,428,798 | 6/1995 | Sekine et al. | 395/750 |
| 5,430,883 | 7/1995 | Horiuchi | 395/750 |
| 5,440,748 | 8/1995 | Sekine et al. | 395/750 |
| 5,475,271 | 12/1995 | Shibasaki et al. | 307/31 |

Primary Examiner—Alpesh M. Shah
Attorney, Agent, or Firm—Staas & Halsey

[57] ABSTRACT

The present invention permits mounting and optimization of a hierarchically necessary number of units corresponding to the scale of input/output subsystems. An input/output subsystem is organized by dividing it into a basic portion including power units and an expanded portion including one or more input/output units. Each of the input/output subsystems has a plurality of built-in magnetic disk modules. The enclosure of a subsystem are composed of a basic enclosure mounting thereon power units and a prescribed number of input/output units forming a basic portion, and an expanded enclosure mounting thereon remaining input/output units other than those mounted on the basic enclosure. The power unit automatically recognizes the mounting status of input/output units, and ensures a necessary power supply capacity.

5 Claims, 13 Drawing Sheets

INPUT/OUTPUT SUBSYSTEM FOR COMPUTER this application is a continuation of application Ser. No. 08/255,941, filed Jun. 7, 1994, now abandoned.

BACKGROUND OF THE INVENTION

The present invention relates to an input/output subsystem for a computer provided for an external storage, particularly to an input/output subsystem which makes it possible to meet the requirement for expansion by hierarchically configuring groups of devices.

A recent computer system is often built with a great number of direct access storage devices such as magnetic disk units as an input/output subsystem. For an enclosure composing such an input/output subsystem, a magnetic disk unit has conventionally had a storage capacity of about 1 to 4 GB for an 8-inch or 5-inch disk, and about ten such magnetic disk units have usually been mounted on an enclosure in many cases. A subsystem enclosure in such a case has an enclosure size, a power section and an external interface based on the assumption of a configuration for the maximum mounting.

There has however been recently a general tendency toward a smaller size and a larger capacity of a magnetic disk unit: there is available at present, for example, a 3.5-inch disk unit having a capacity of 1 to 2 GB. In this case, when building a subsystem enclosure such as a conventional one, it is possible to house even several tens of downsized 3.5-inch magnetic disk units, and to build a single large-scaled enclosure having a capacity of several tens of GB. If, in this case, an enclosure size, a power supply section and an external interface are designed on the assumption of only the maximum configuration as in a conventional subsystem enclosure, the resulting capacity range would be so large as to range from a minimum configuration of 1 GB to a maximum configuration of several tens of GB. When building a subsystem enclosure based on the conventional maximum configuration, a smaller scale of configuration leads to provision of an excessive installation capacity of enclosure, power supply section and interface, this resulting in a very poor efficiency.

SUMMARY OF THE INVENTION

According to the present invention, there are provided an input/output subsystem for a computer, which permits construction of an optimized system by making it possible to mount hierarchically necessary units and modules depending upon the scale of the input-output subsystem.

The input/output subsystem of the present invention is built by dividing it into a basic portion comprising power units and an expanded portion comprising one or more input/output units, and each input/output unit has a plurality of built-in input/output modules such as magnetic disk units.

The subsystem enclosure comprises a basic enclosure mounting thereon basic power units and a prescribed number of input/output units, and one or more expansion enclosures mounting remainder of the input/output units mounted on the basic enclosure. The power unit of the basic enclosure is provided with a power control section and one or more expandable power supply sections. The power supply sections in a number corresponding to the number of actually mounted input/output units are mounted. The power control section of the power unit is provided with a mounting status recognizing means which recognizes the actual number of mounted input/output units and the actual number of mounted power supply sections. When receiving a power-on instruction from a higher-level device, the power control section of the power unit makes reference to the mounting status recognizing section, and issues a control signal for instructing a power-on operation to the mounted input/output units and the power supply sections.

Furthermore, the power unit is provided with one or more expandable auxiliary power sections. In this case also, the mounting status recognizing section for power control provided in the power unit recognizes the number of mounted spare power sections, and when receiving a power-on instruction from a higher-level device, issues a control signal instructing a charging start operation to the auxiliary power sections mounted with reference to the mounting status recognizing section.

In addition, a cooling section using a motor-driven cooling fan is provided for each of the power units and the input/output units. In this case also, the mounting status recognizing section of the power control section provided in the power unit recognizes the number of mounted cooling sections, and when receiving a power-on instruction from a higher-level device, issues a control signal instructing the mounted cooling section to perform cooling operation, referring to the mounting status recognizing section.

The mounting status recognizing section provided in the power control section is connected through signal lines to the input/output units, the power supply section, the auxiliary power section, and the cooling section, and is provided with a register storing bit information representing the mounting status. The power control section provided in the power section is formed with double circuits.

According to the input/output unit for a computer of the present invention, it is possible to build a subsystem enclosure with optimized enclosure installation capacity, power section and interface by hierarchically arranging groups of modules mounted on a single input/output subsystem into a basic portion and an expansion portion with an appropriate number of modules as a unit, and hierarchically mounting necessary modules corresponding to the scale of the subsystem. It is also possible for the basic portion to recognize the status of system configuration by pulling out the information line showing the status of mounting of the expansion portion to the basic portion. This function permits determination of the mounting status of the system by the basic portion and automatic power-on control of an automatic power input instruction to magnetic disk units through acquisition of information about necessary power capacity of the power section.

The above description and objects, features and advantages of the present invention will become more apparent from the following detailed description with reference to the drawings.

DETAILED DESCRIPTION OF THE PREFERRED EMBODIMENTS

Figure 1:
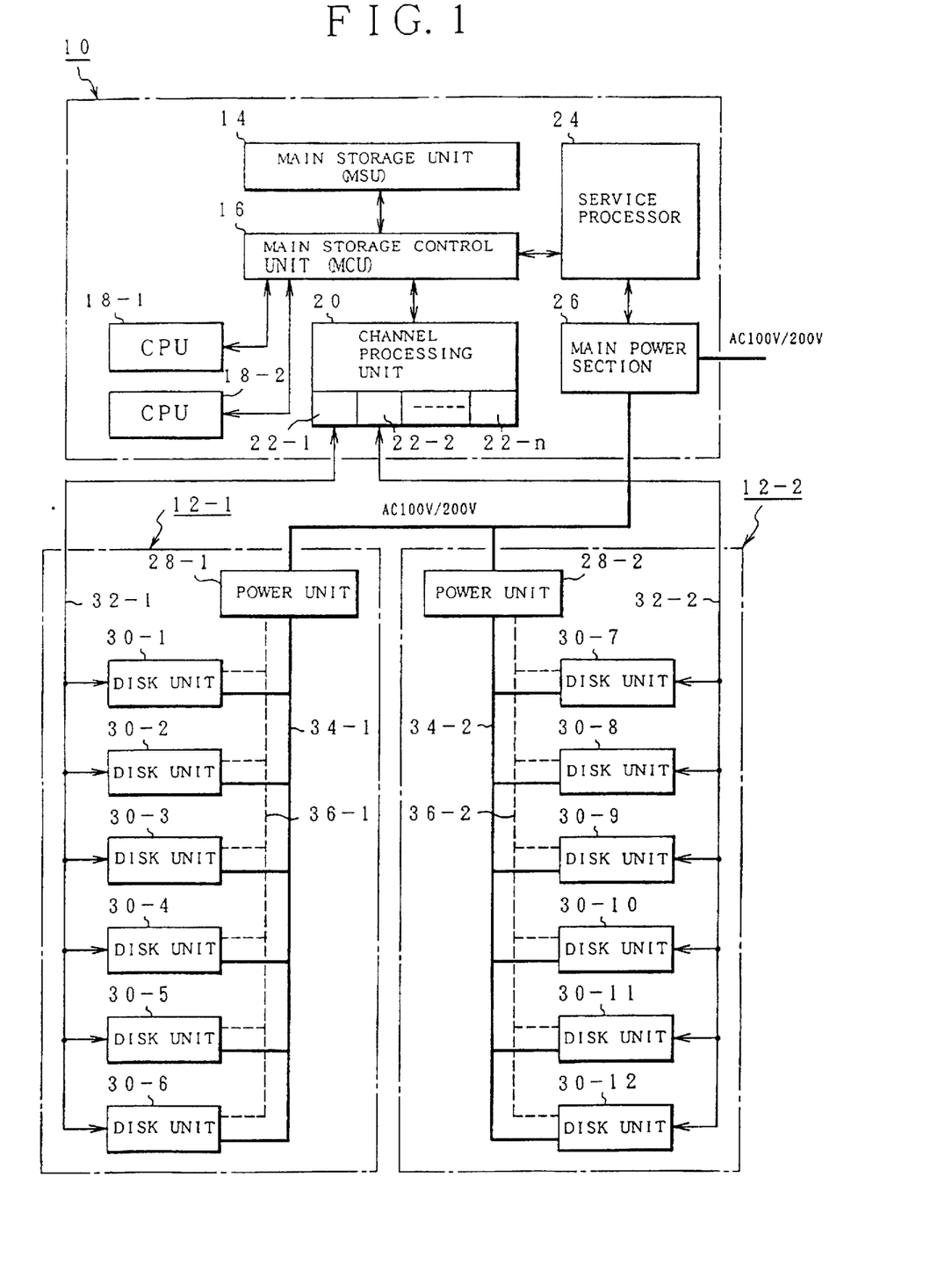
FIG. 1 is a block diagram illustrating a computer system to which the present invention is applicable.

In FIG. 1, two input/output subsystems 12-1 and 12-2 are provided in this embodiment for a mainframe 10 forming a computer main body. The mainframe 10 has a main storage unit 14 and a main storage control unit 16. The main storage control unit 16 has a multiple-CPU configuration having, for example, two CPUs 18-1 and 18-2. The main storage control unit 16 is provided with a channel processing unit 20, and the input/output subsystems 12-1 and 12-2 are connected to channels 22-1 and 22-2, respectively, from among a plurality of channels 22-1 to 22-n. The mainframe 10 has a service processor 24 which permits starting, stopping and maintenance control of the system. There is furthermore provided a main power section 26 controlled by the service processor 24, and AC power AC 100 V or AC 200 V is supplied to the input/output subsystem 12-1 through the main power section 26. The input/output subsystems 12-1 and 12-2 have the same configurations. Taking the input/output subsystem 12-1 as an example, the subsystem comprises a power unit 28-1 forming the basic portion, and disk units 30-1 to 30-6 forming the expanded portion. This embodiment presents a case in the maximum configuration with six units, which comprises disk units 30-1 to 30-6. The power unit 28-1 converts AC 100 V or AC 200 V supplied from the mainframe 10 side into prescribed DC voltage and supplies power through a power line 34-1 to the individual disk units 30-1 to 30-6. The power unit 28-1 is connected through a power control line 36-1 to the disk units 30-1 to 30-6. The power unit 28-1 recognizes the mounting status of the disk units 30-1 to 30-6 in the input/output subsystem 12-1 through the power control line 36-1, and sends a control signal of power input when receiving a power-on instruction from the mainframe 10. An input/output interface bus 32-1 for the disk units 30-1 to 30-6 is connected from the channel 22-1 of the channel processing unit 20 provided in the mainframe 10. This configuration of the input/output subsystem 12-1 is the same also for the input/output subsystem 12-2, except however that the power unit is indicated by 28-2, and the disk units are indicated by 30-7 to 30-12.

Figure 2:
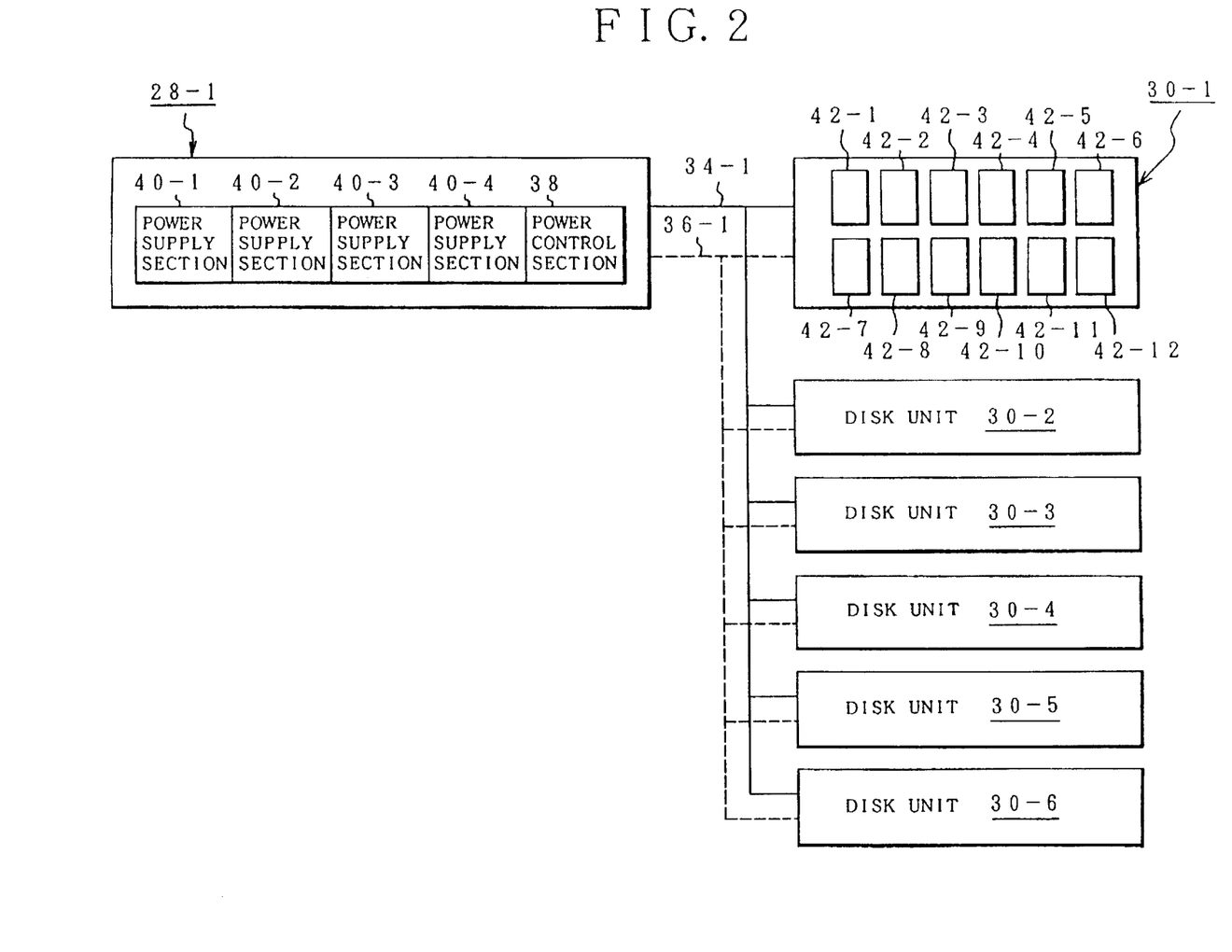
FIG. 2 is a block diagram illustrating the maximum configuration of subsystems of the present invention.

FIG. 2 illustrates details of the input/output subsystem 12-1 as picked up from FIG. 1. The power unit 28-1 is provided with a power control section 38 and four power supply sections 40-1 to 40-4. Each of the disk units 30-1 to 30-6 mounts thereon, on the other hand, 12 magnetic disk modules 42-1 to 42-12, in this embodiment, as direct access storage devices, as typically represented by the disk unit 30-1 in FIG. 2. Since 12 magnetic disk modules are mounted on a single disk unit, the maximum configuration having the six disk units 30-1 to 30-6 would result in mounting of 72 magnetic disk modules in total. The power control section 38 can recognize the number of disk units 30-1 to 30-6 mounted on the input/output subsystems and the number of power supply sections 40-1 to 40-4 provided in the power unit 28-1 with reference to a configuration control register described in detail later. When receiving an instruction of power-on from the higher-level mainframe 10, the power control section 38 instructs a power-on operation of the power supply sections in a number corresponding to the number of mounted disk units on the basis of the result of recognition of mounting status. At the same time, it issues a control signal of the power-on instruction to the disk units known to be covered by the current mounting.

Each of the power supply sections 40-1 to 40-4 is an AC/DC converter, to which AC 100 V or AC 200 V is supplied as an input, and provides DC 29 V, for example, for the disk units 30-1 to 30-6 and DC 5 V serving as a power supply to the power control section 38 as an output. More specifically, a switching regulator is used, into which DC voltage obtained through rectification of AC input is entered and from which prescribed DC voltage 29 V or 5 V is provided as an output. The power capacity of the power supply sections 40-1 to 40-4 should meet the power capacity for two disk units. Allocation in practice should be as follows: the power supply section 40-1 should cover the disk units 30-1 and 30-2; the power supply section 40-2 should cover the disk units 30-3 and 30-4; the power supply section 40-3 should cover the disk units 30-5 and 30-6; and the remaining power supply section 40-4 is for backup for the disk units 30-1 to 30-6. Power DC 29 V is supplied to the disk units 30-1 to 30-6 through a common power line 34-1. DC 29 V output lines for the power supply sections 40-1 to 40-4 would therefore be commonly connected to the single power supply line 34-1. DC 5 V is supplied to the power control section 38 by commonly connecting the DC 5 V outputs of the individual power supply sections 40-1 to 40-4.

Figure 3A:
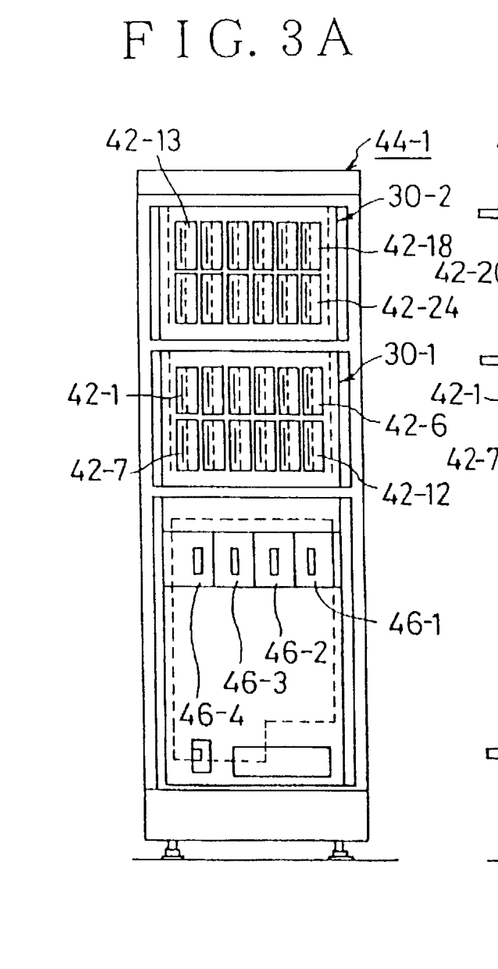
FIGS. 3A, 3B and 3C are descriptive views illustrating the mounting status of the basic enclosure of the present invention.
Figures 3B, 3C:
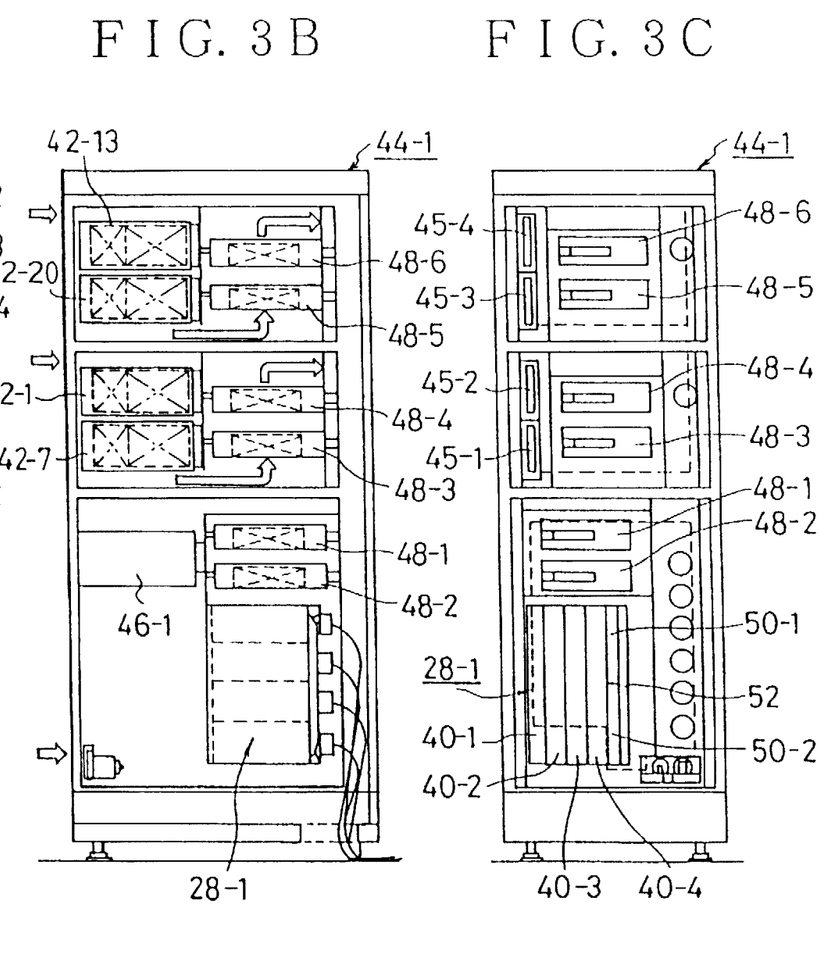
Figure 4A:
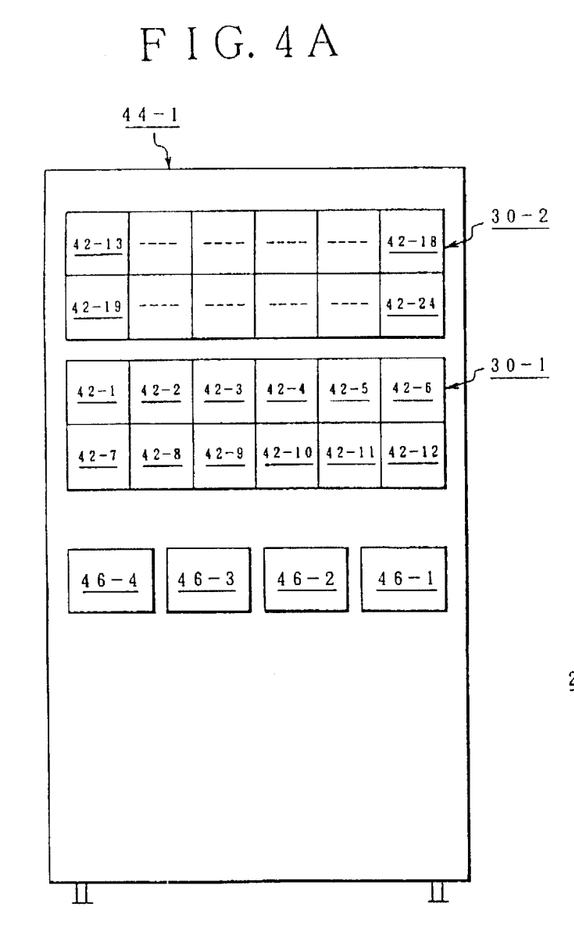
FIGS. 4A and 4B are descriptive views illustrating the unit layout of the basic enclosure corresponding to FIGS. 3A and 3C.
Figure 4B:
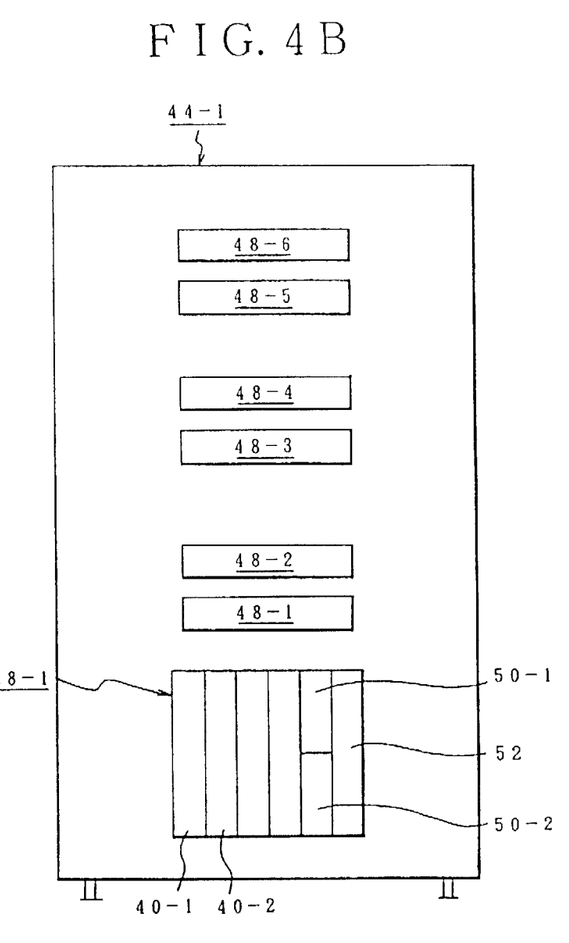

FIG. 3A is a front view illustrating the mounting status of the individual modules in the basic enclosure used in the present invention; FIG. 3B is a side view thereof; and FIG. 3C is a back view thereof. Referring to FIG. 3A, the disk units 30-1 and 30-2 are mounted on the surface of the upper portion of the basic enclosure 44-1. In the disk unit 30-1, 12 magnetic disk modules 42-1 to 42-12 are arranged in two upper and lower stages with six modules for each stage. Similarly, in the disk unit 30-2, 12 magnetic disk modules 42-13 to 42-24 are arranged in two stages with six modules each. As shown in FIG. 3B, two cooling fan units 48-3 to 48-6 are installed behind the disk units 30-1 and 30-2, and the open air introduced in a direction indicated by the arrow in the drawing passes through the enclosure and is discharged for air cooling. A basic portion is housed in the lower portion of the basic enclosure 44-1, and battery units 46-1 to 46-4 serving as auxiliary power supplies are installed on the front side as shown in FIG. 3A. During normal supply of commercial electric power, the battery units 46-1 to 46-4 are held in charging state by rectifying output from the power unit 28-1. Upon power failure, the power line is automatically switched over to the battery units 46-1 to 46-4 for power supply backup. A power section 28-1 is housed in the lower portion on the back of the basic enclosure 44-1 shown in FIG. 3C. In the power supply section 28-1, power control circuit sections 50-1 and 50-2 and a line concentrating section 52 compose the power control section 38 shown in FIG. 2. Four power supply sections 40-1 to 40-4 are provided to the left thereof. As is clear from the bottom of the basic unit shown in FIG. 3B, two cooling fan units 48-1 and 48-2 are installed on the back of the battery units 46-1 to 46-4 installed on the front side. Interface connectors 45-1/45-2 and 45-3/45-4 are installed two each for the disk units 30-1 and 30-2 on the top left side of the back of the basic enclosure 44-1 shown in FIG. 3C. FIG. 4A schematically illustrates the front side of module mounting status in the basic enclosure 44-1 shown in FIGS. 3A and 3C, and FIG. 4B illustrates the back side thereof.

Figures 5A, 5B, 5C:
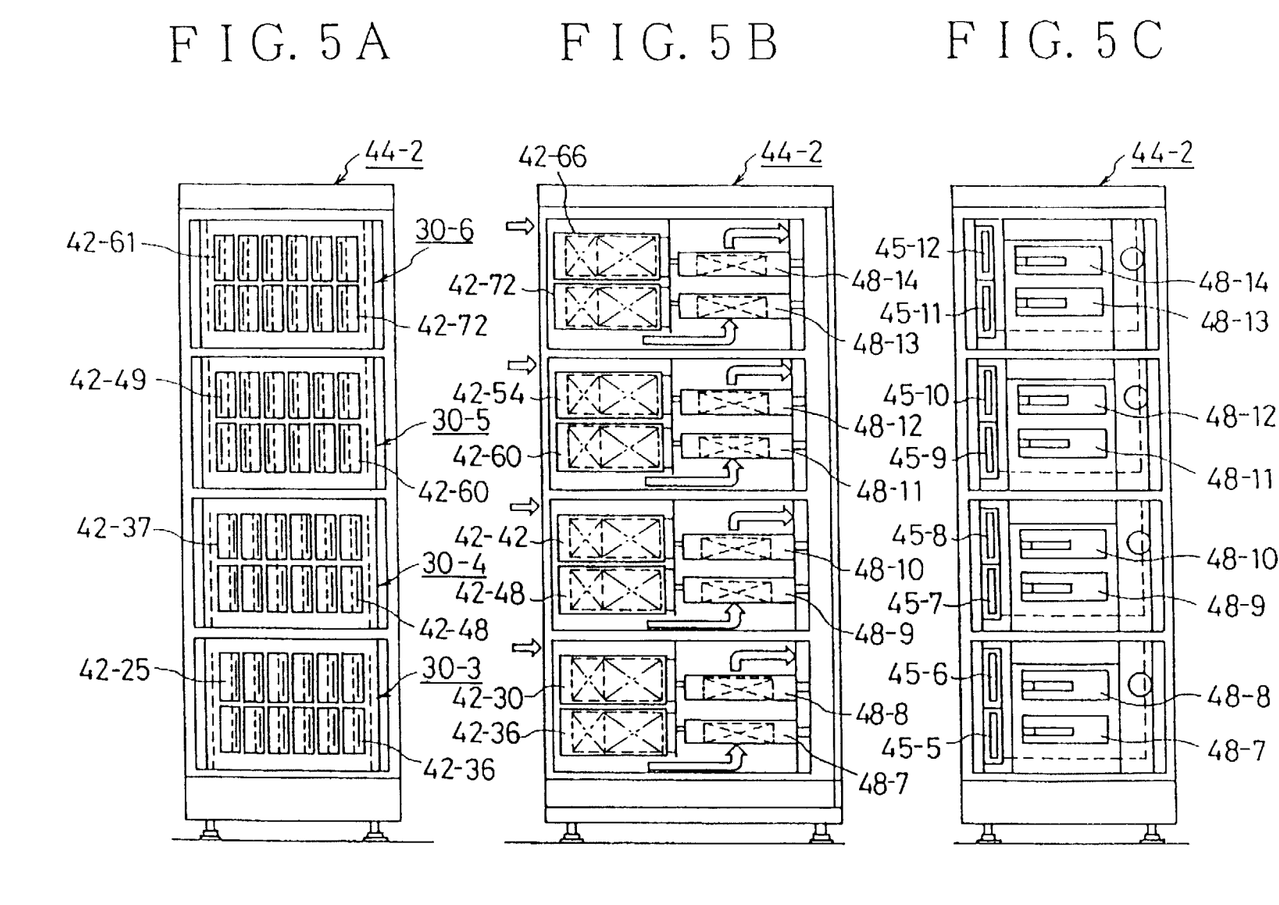
FIGS. 5A, 5B and 5C are descriptive views illustrating the mounting status of the expanded enclosure of the present invention.
Figure 6A:
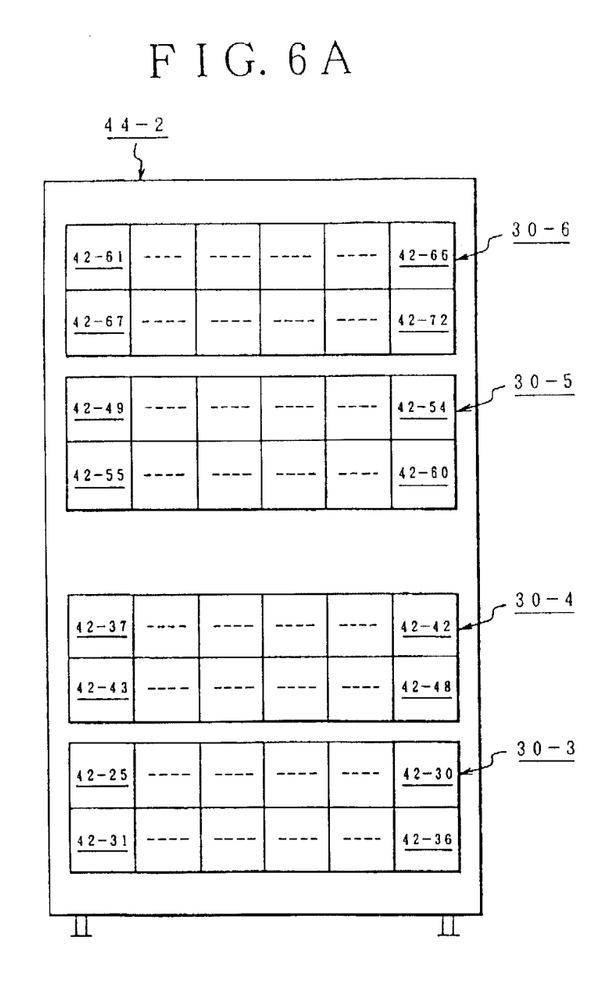
FIGS. 6A and 6B are descriptive views illustrating the unit layout of the expanded enclosure corresponding to FIGS. 5A and 5C.
Figure 6B:
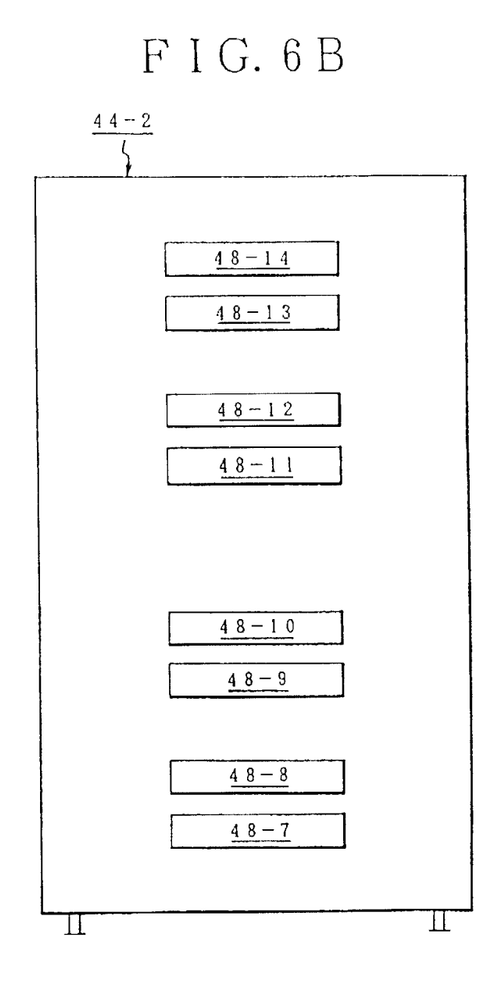

FIG. 5A is a front view of mounting status of the expanded enclosure used in the subsystem of the present invention; FIG. 5B is a side view thereof; and FIG. 5C is a back view thereof. Four disk units 30-3 to 30-6 are sequentially mounted from bottom on the front side of FIG. 5A. As is clear from FIG. 5B, two each of cooling fan units 48-7 to 48-14 are installed on the back of each of the disk units 30-3 to 30-6. Furthermore, as shown in the back view of FIG. 5C, two each of interface connectors 45-5 to 45-12 are installed for each of the disk units 30-3 to 30-6. FIGS. 6A and 6B schematically illustrate the arrangement of modules in the expanded enclosure 44-2 shown in FIGS. 5A and 5C.

Figure 7A:
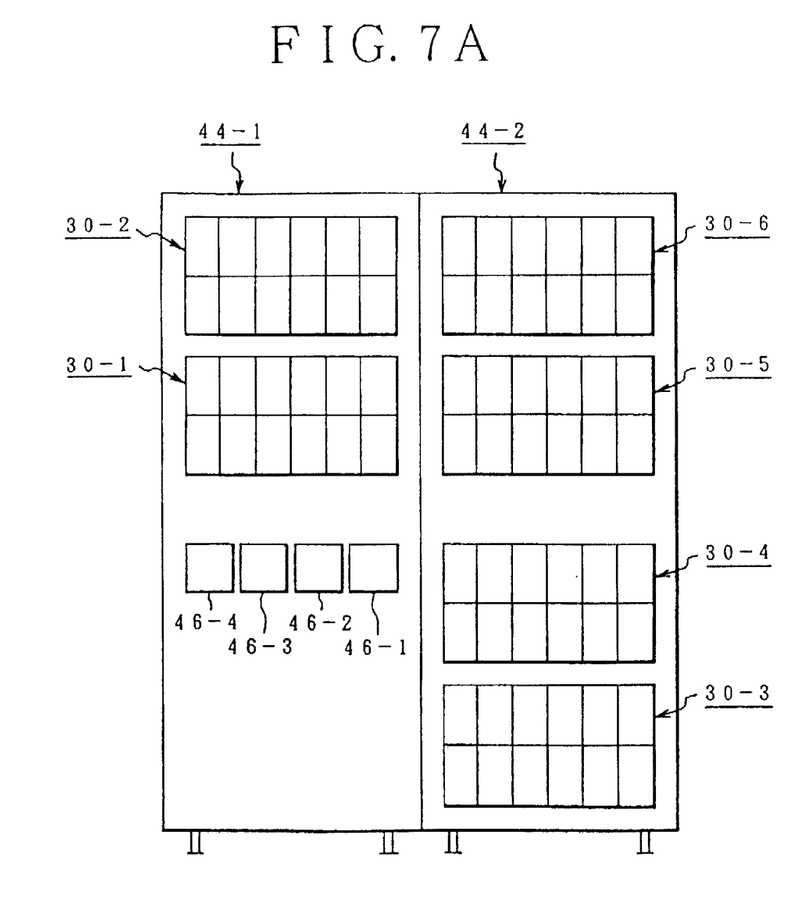
FIGS. 7A and 7B are descriptive views illustrating the enclosure in the maximum configuration of the present invention.
Figure 7B:
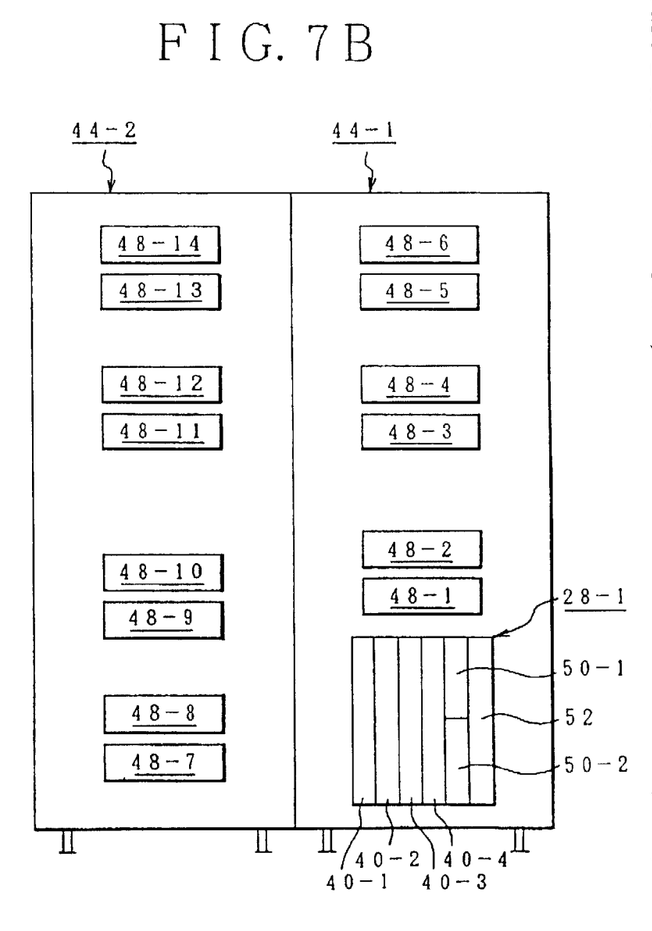

FIG. 7A schematical front view of the mounting status of the enclosure in the maximum configuration in the present invention. In the maximum configuration, the basic enclosure 44-1 and the expanded enclosure 44-2 are arranged in parallel with each other, and six disk units 30-1 to 30-6 in the maximum configuration are mounted thereon. In response to the use of the maximum configuration, the four battery units 46-1 to 46-4 are mounted. On the back as shown in FIG. 7B, the four power supply sections 40-1 to 40-4 corresponding to the maximum configuration are mounted on the power section 28-1 provided in the lower portion of the basic enclosure 44-1. It is needless to mention that, irrespective of the configuration, power control circuit sections 50-1 and 50-2 and a line concentrating section 52 are mounted to form a basic portion. Furthermore, cooling fan units 48-1 to 48-14 are mounted with two as a group on the back to correspond to the battery units 46-1 to 46-4 and the disk units 30-1 to 30-3.

Figure 8:
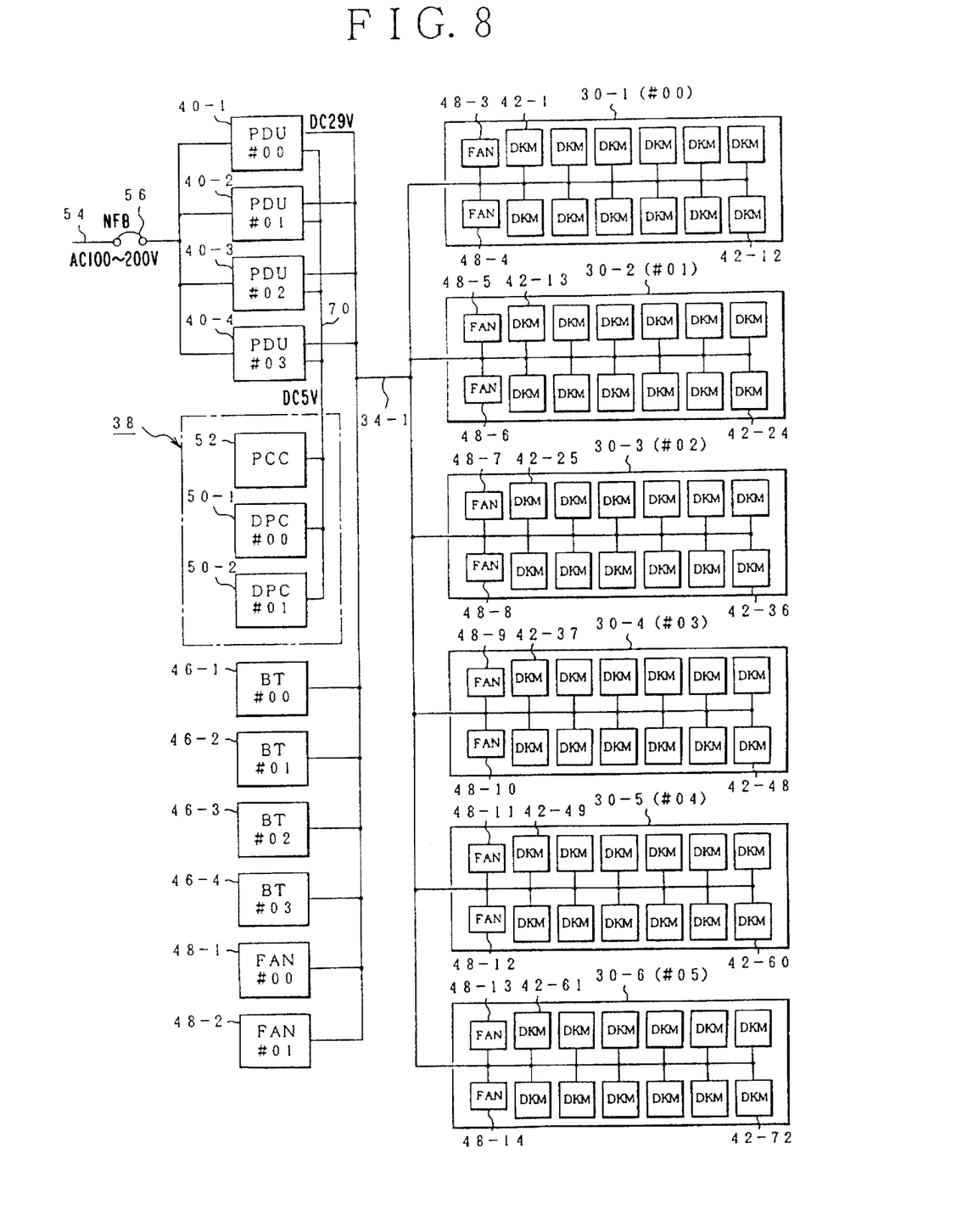
FIG. 8 is a block diagram illustrating the power circuits in the maximum configuration.

FIG. 8 illustrates the power system in the maximum configuration shown in FIGS. 7A and 7B. In FIG. 8, the power supply sections 40-1 to 40-4 are abbreviated as PDUs; the power control circuit sections 50-1 and 50-2, as DPCs; the line concentrating section 52, as PCC; the battery unit, as BT; the cooling fan unit, as FAN; and the magnetic disk unit of the disk unit, as DKM. AC 100 V or AC 200 V is supplied through a non-fuse battery (NFB) 56 from an AC line 54 on the mainframe side. The AC voltage is entered into the power supply sections 40-1 to 40-4 and converted into DC 29 V and DC 5 V, respectively, which are delivered as output. DC 29 V from the power supply units 40-1 to 40-4 is commonly connected by a power line 34-1 to the six disk units 30-1 to 30-6. DC 5 V output from the power supply units 40-1 to 40-4 is commonly connected to a power line 70, and supplied to power control circuit sections 50-1 and 50-2 and a line concentrating section 52 provided in the power control section 38 as source voltage. Output from the battery units 46-1 to 46-4 provided to correspond to the power supply sections 40-1 to 40-4 is commonly connected to the power line 34-1 for the disk units 30-1 to 30-6. Upon power failure on AC side, if any, backup power can be supplied from the batteries 46-1 to 46-4. In addition, the power line 34-1 supplied with DC 29 V supplies operating power to the cooling fan units 48-1 and 48-2 provided on the power section side. The power line 34-1 from the power section side is branched and sided into the disk units 30-1 to 30-6, and 12 magnetic disk modules and the cooling fan units are connected to each of the thus sided power lines 34-1.

Figure 9:
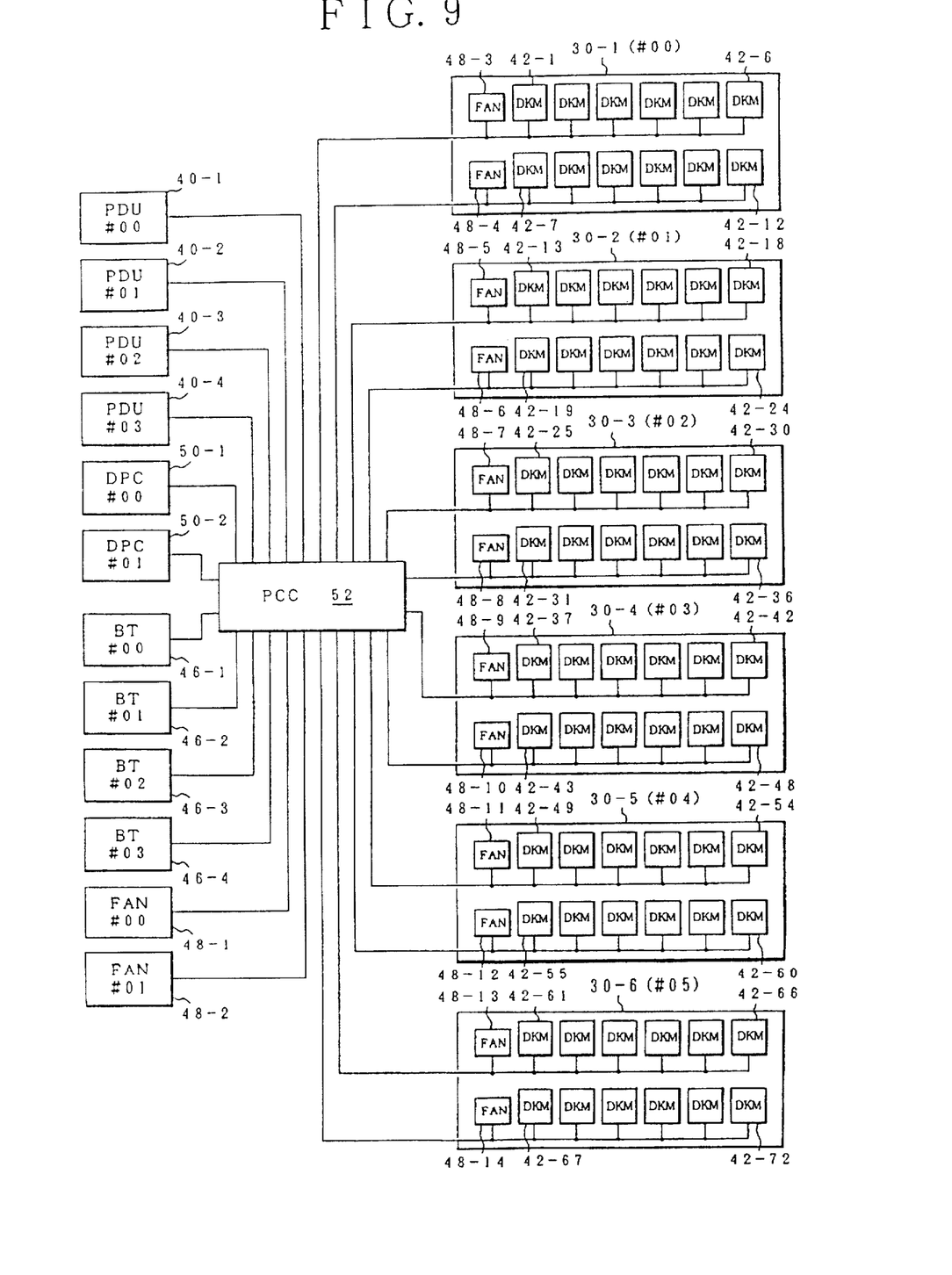
FIG. 9 is a circuit block diagram illustrating the power control circuits in the maximum configuration.

FIG. 9 illustrates the power control system between the individual units in the maximum configuration shown in FIGS. 7A and 7B. All control lines from the other units are connected through the line concentrating section 52 to the power control circuit sections 50-1 and 50-2. In this embodiment, double circuit scheme is achieved by providing two power control circuit sections 50-1 and 50-2. The power control circuit sections 50-1 and 50-2 have quite the same circuit configurations, and OR of the power control circuit sections 50-1 and 50-2 is selected at the line concentrating section 52 to use it as a control signal. A signal representing the mounting status, for example, from the other units is divided into two at the line concentrating section 52, and two identical pieces of information are supplied to the power control circuit sections 50-1 and 50-2. Through such duplication in the hardware aspect of the power control circuit sections 50-1 and 50-2, the power control function can be maintained in the normal state even upon occurrence of a failure in one circuit. The power supply sections 40-1 to 40-4 perform AC-DC conversion and subsequent DC-DC conversion into DC 29 V and DC 5 V. More specifically, the power supply sections 40-1 to 40-4 receive a control signal instructing power-on from the power control circuit sections DPC 50-1 and 50-2 and provide DC 29 V and DC 5 V as output, bringing, for example, the switching regulator serving as a DC-DC converter into on-state. When supplying power in a normal state of AC power supply, the battery units 46-1 to 46-4 turn on the charging circuit for the built-in battery upon receipt of a control signal instructing power-on from the power control circuit sections 50-1 and 50-2 and perform charging of the built-in battery with DC 29 V from the power lines to the power supply circuits 40-1 to 40-4. When power supply is discontinued by power failure, on the other hand, the battery units 46-1 to 46-4 switch over the built-in battery from charged state into power supply state against load upon receipt of a power failure detecting signal from the power control circuit sections 50-1 and 50-2.

Upon receipt of a control signal issued along with instruction of power-on from the power control circuit sections 50-1 and 50-2, the cooling fan units 48-1 and 48-2 become operable. More specifically, the fan motors are automatically controlled in such manner that the fan motors are driven when, for example, the temperature detected by the temperature sensor exceeds a prescribed value, and are stopped when the temperature drops. On the side of the disk units 30-1 to 30-6, on the other hand, a control signal of power-on instruction is supplied from the power control circuit sections 50-1 and 50-2 to the disk unit 30-1, for example. Upon receipt of this control signal, the cooling fan units 48-3 and 48-4 become operable, and drives, for example, the fans on the basis of the detected temperature from the temperature sensor. The disk modules 42-1 to 42-12 conduct power-on operation accompanied by starting of the spindle motor when receiving a power-on signal from a higher-level device through an interface bus, in addition to a blanket control signal from the power control circuit sections 50-1 and 50-2.

Figure 10:
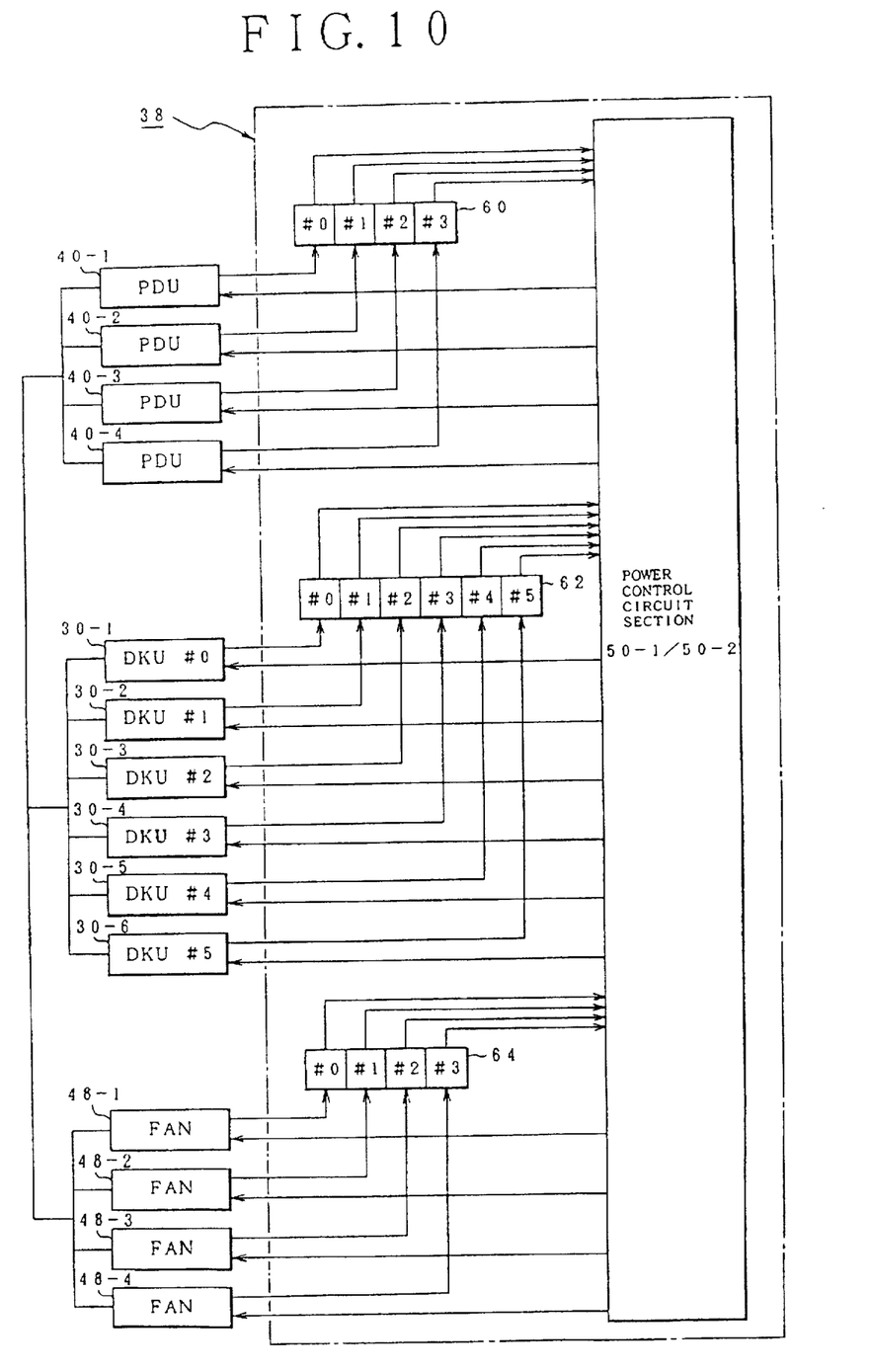
FIG. 10 is a clock diagram illustrating an embodiment of the configuration control register provided in the power control circuits.

FIG. 10 illustrates an embodiment of the configuration control register for recognizing the mounting status, provided on the power section side. A configuration control register 60 provided with register regions #0 to #3 individually corresponding to the power supply sections 40-1 to 40-4 is provided in the power section 38. Another configuration control register 62 provided with register regions #0 to #5 corresponding to the disk units 30-1 to 30-6 is provided. In addition, a configuration control register 64 provided with register regions #0 to #3 corresponding to the four cooling fan units 48-1 to 48-4 is provided. Each of the configuration control registers 60, 62 and 64 is connected through a status information line to the corresponding module, and upon mounting, for example, a bit 1 is set in the corresponding register region. The power control circuit sections 50-1 and 50-2 can read the contents of the configuration registers 60, 62 and 64 through setup upon energizing by power-on, and to recognize the mounting status of the power supply section, the magnetic disk modules and the cooling fan units. The power control circuit sections 50-1 and 50-2 can recognize the mounting status of the disk units with reference to the configuration control register 62, and deliver a control signal of power-on instruction only to the disk units in the mounted state as an output. By referring to the configuration control register 60, it is possible to recognize the number of mounted power supply units and recognize also whether or not a power capacity corresponding to the number of mounted disk units as recognized by the configuration control register 62 is ensured. If the number of power supply units is insufficient to satisfy the power capacity, a power mounting error is notified to the higher-level devices. In addition, by recognizing the mounting status of the cooling fan units from the configuration control register 64, it is possible to determine whether or not an appropriate number of cooling fan units are mounted to meet the power supply units and the disk units.

Figure 11A:
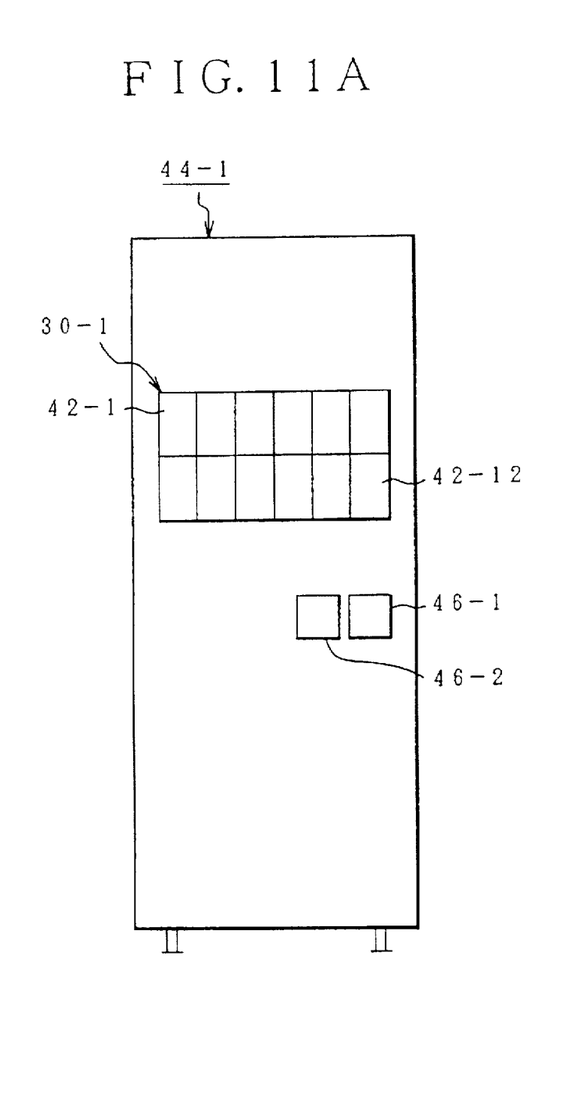
FIGS. 11A and 11B are descriptive views illustrating the enclosure in the minimum configuration of the present invention.

FIG. 11A illustrates the front side of the mounted state in the minimum configuration of the input/output subsystem of the present invention. In this minimum configuration, only a basic enclosure 44-1 is provided, and on the front side, only one disk unit 30-1 is installed. Power control circuit sections 50-1 and 50-2, a line concentrating section 52, a power supply section 40-1, and a power supply section 40-4 for backup purposes are provided as a basic portion on the back side shown in FIG. 11B. On the front side, only two battery units 46-1 and 46-2 are mounted to correspond to the two power supply sections 40-1 and 40-2. Also, only four cooling fan units 48-1 and 48-2 on the basic portion side and cooling fan units 48-3 and 48-4 on the disk unit 30-1 side are provided.

Figure 11B:
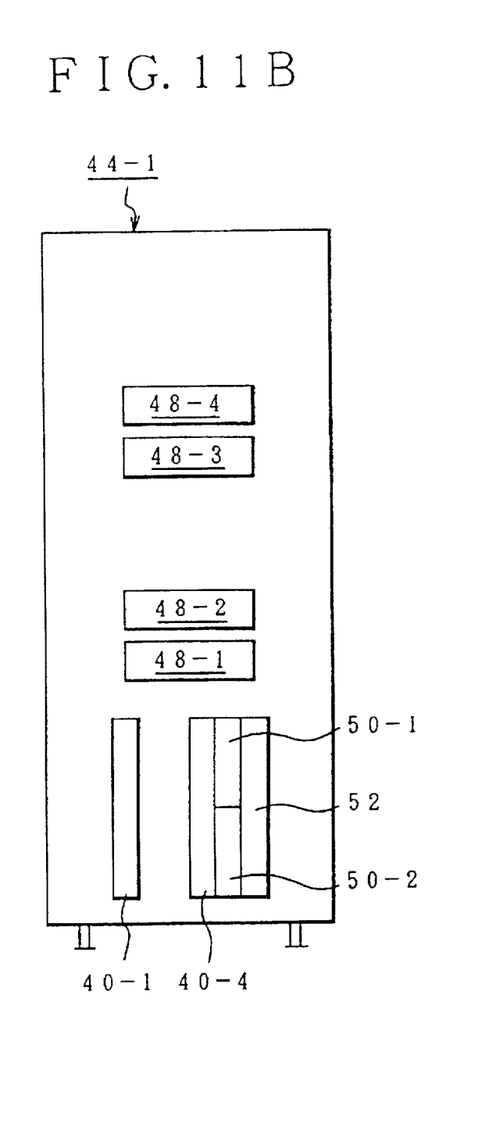
Figure 12A:
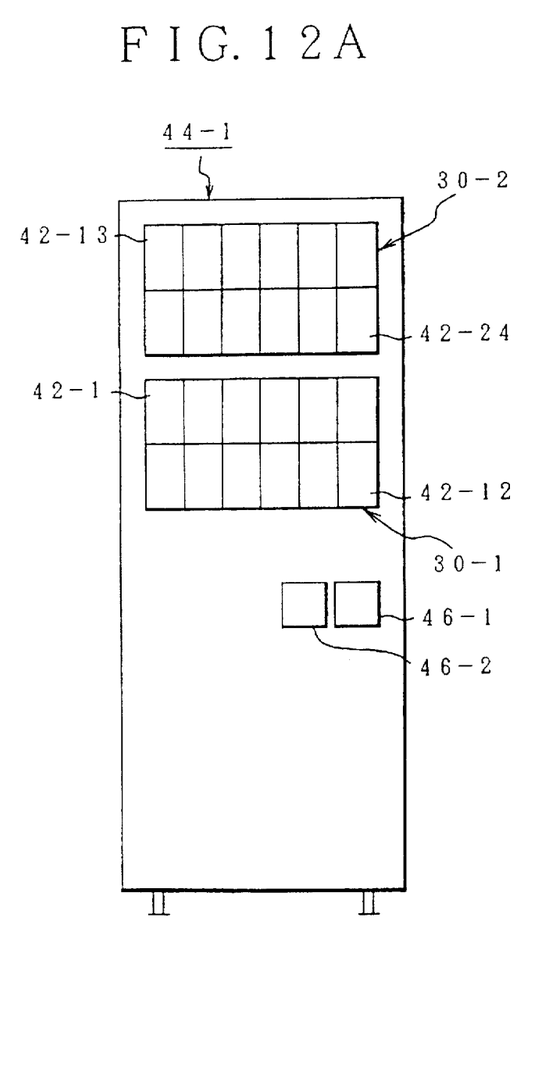
FIGS. 12A and 12B are descriptive views illustrating the enclosure in the two-disk-unit configuration of the present invention.
Figure 12B:
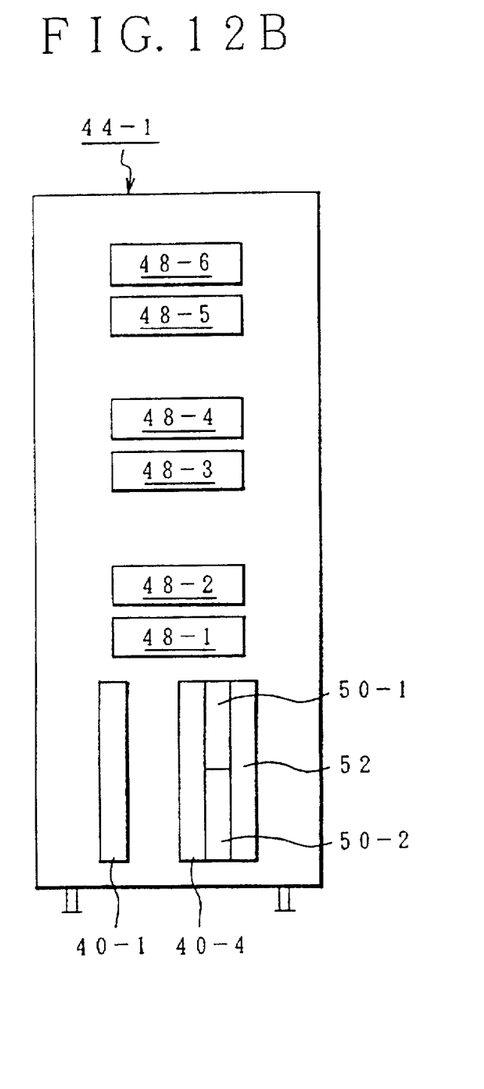

FIGS. 12A and 12B illustrate a two-disk-unit configuration built by adding another one disk unit to the minimum configuration shown in FIGS. 11A and 11B. In this configuration, a disk unit 30-2 is added as shown in FIG. 12A, and accordingly two cooling fan units 48-5 and 48-6 are added as shown in the back view of FIG. 12B. The mounted state of the other modules is the same as in the minimum configuration shown in FIGS. 11A and 11B.

Figure 13A:
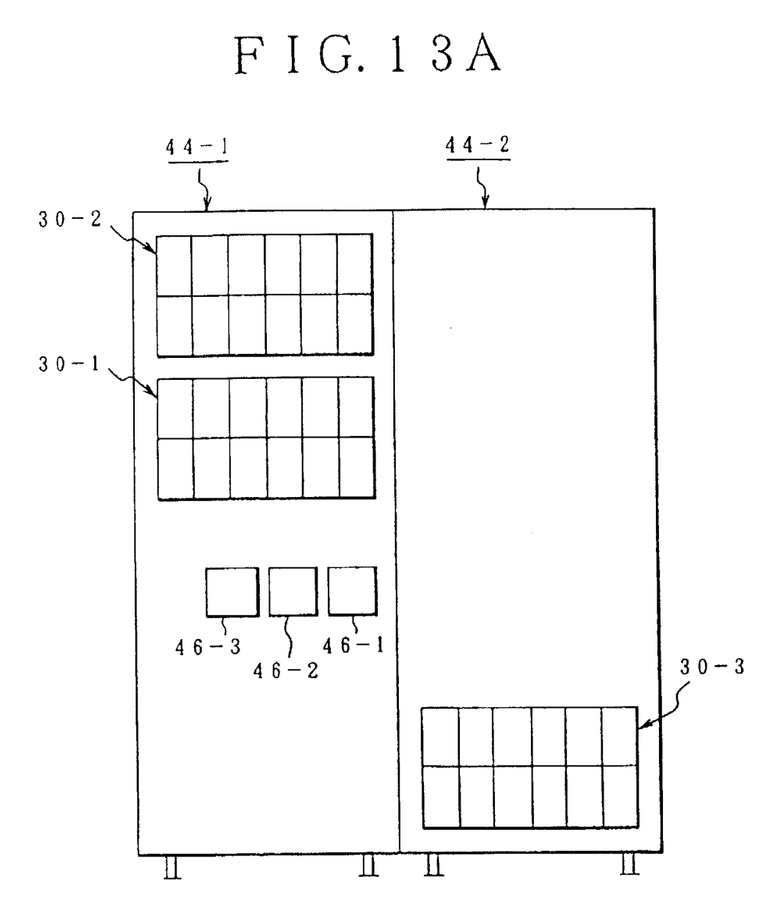
FIGS. 13A and 13B are descriptive views illustrating the enclosure in the three-disk-unit configuration of the present invention.
Figure 13B:
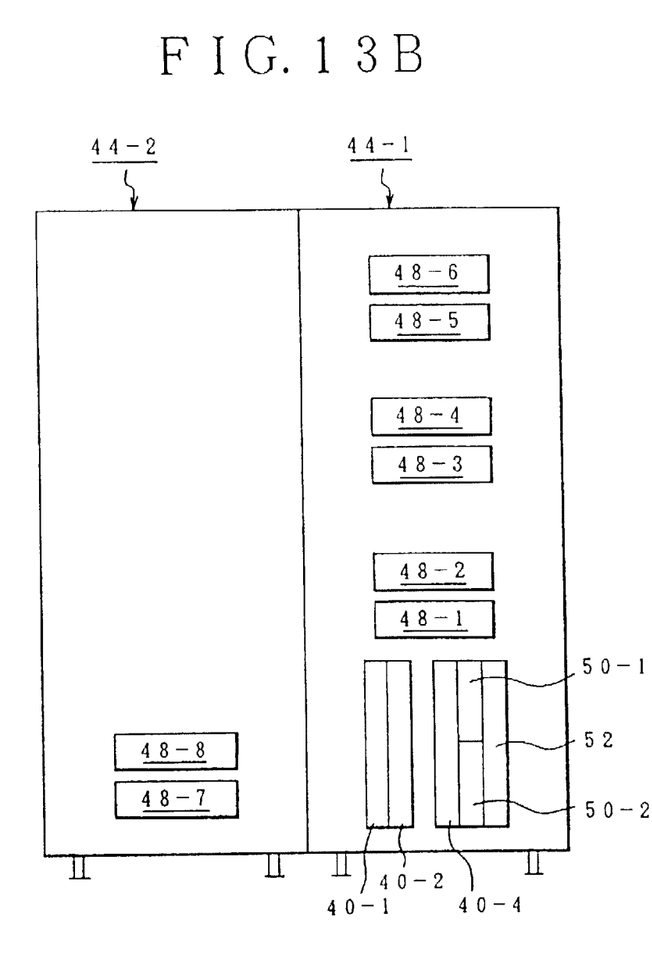

FIG. 13A and 13B illustrate a three-disk-unit configuration built by adding further another one disk unit to the configuration shown in FIGS. 12A and 12B. In this configuration, an expanded enclosure 44-2 is installed in addition to the basic enclosure 44-1. More specifically, as shown in FIG. 13A, a disk unit 30-3 is mounted as an expansion on the expanded enclosure 44-2 installed adjacent to the basic enclosure 44-1. Along with the addition of this disk unit 30-3, a power supply section 40-2 is added to the power section of the basic enclosure on the back shown in FIG. 13B. A battery unit 46-3 is added on the surface side of the basic enclosure 44-1 shown in FIG. 13A. It is needless to mention that cooling fan units 48-7 and 48-8 are added to the back side of the expanded enclosure 44-2. Furthermore, a four-unit configuration built by adding another one disk unit to the configuration shown in FIGS. 13A and 13B, or a five-disk-unit configuration made by adding further another disk unit may be adopted as required.

According to the present invention, as described above, it is possible to increase the number of power supply sections in the basic portion, and to add input/output section in response to the scale of the input/output subsystems required by the computer. It is not therefore necessary to provide power enclosures and interfaces in a number capable of coping with the maximum configuration in the initial stage of system introduction. It is thus possible to optimize the enclosure installation capacity, power sections and interfaces just coping with the desired system scale. As a result, it is possible to reduce the installation space and costs for input/output subsystems upon introduction of a system.

The above-mentioned embodiments have covered cases where a disk unit has a plurality of built-in magnetic disk modules as direct access devices forming the input/output subsystem. However, photomagnetic disk modules, semiconductor memory modules or other direct access devices may well be employed.

While the above embodiments have covered a maximum configuration comprising six disk units per input/output subsystem, an appropriate number of disk units may be used for the maximum configuration as required.

This applies also to the number of magnetic disk modules to be provided per disk unit of 12, which may be selected appropriately according to the necessity. Also in other respects, the present invention is not limited to numerical values mentioned for the embodiments shown.

What is claimed is:

1. An input/output subsystem of a mainframe computer, comprising:

a basic portion including a plurality of power units each having a power control means and a number of expandable power supply means; and an expanded portion comprising one or more input/output units, each of said input/output units has built-in input/output modules in a prescribed number, wherein said number of power supply means corresponds to a number of said plurality of input/output units;

the power control means comprises a mounting status recognizing means which recognizes the number of said plurality of input/output units and the number of said plurality of power supply means;

the power control means upon receiving a power-on instruction from a higher-level device, said mounting status recognizing means of the power control means, issues a control signal instructing a power-on operation to said plurality of input/output units and said number of power supply means:

said power unit is additionally provided with a number of auxiliary power means; and the mounting status recognizing means upon receiving a power-on instruction from a higher-level device, issues a control signal instructing a charging start operation to said number of auxiliary power means.

2. An input/output subsystem according to claim 1, wherein each of said plurality of power units and said one or more input/output units has a cooling means; and the mounting status recognizing means recognizes a number of said cooling means, and upon receiving a power-on instruction from a higher-level device, issues a control signal instructing a charging start operation to said number cooling means.

3. An input/output subsystem according to claim 2, wherein said mounting status recognizing means is connected through a signal line to each of said one or more input/output units, said number of expandable power supply means, said number of auxiliary power means, and said number of cooling means, and is provided with a plurality of register means which stores bit information representing mounting status of said one or more input/output units, said number of expandable power supply means, and said number of auxiliary power means.

4. An input/output subsystem for a computer as claimed in claim 1, wherein:

said input/output modules are magnetic disk units.

5. An input/output subsystem for a computer as claimed in claim 1, wherein said power control means comprises double circuits.

* * * * *